(12) United States Patent
Schwalenberg et al.

(10) Patent No.: US 9,976,706 B2
(45) Date of Patent: May 22, 2018

(54) LIGHTING DEVICE HAVING SEMICONDUCTOR LIGHT SOURCES AND A COMMON DIFFUSOR

(71) Applicant: OSRAM GmbH, Munich (DE)

(72) Inventors: Simon Schwalenberg, Donaustauf (DE); Julius Muschaweck, Gauting (DE)

(73) Assignee: OSRAM GMBH, Munich (DE)

( * ) Notice: Subject to any disclaimer, the term of this patent is extended or adjusted under 35 U.S.C. 154(b) by 113 days.

(21) Appl. No.: 14/404,478

(22) PCT Filed: May 27, 2013

(86) PCT No.: PCT/EP2013/060896
§ 371 (c)(1),
(2) Date: Nov. 28, 2014

(87) PCT Pub. No.: WO2013/178597
PCT Pub. Date: Dec. 5, 2013

(65) Prior Publication Data
US 2015/0109775 A1    Apr. 23, 2015

(30) Foreign Application Priority Data

May 31, 2012  (DE) .................. 10 2012 209 131

(51) Int. Cl.
*F21V 8/00* (2006.01)
*F21K 99/00* (2016.01)
(Continued)

(52) U.S. Cl.
CPC .............. *F21K 9/50* (2013.01); *F21K 9/60* (2016.08); *F21K 9/61* (2016.08); *F21V 23/0457* (2013.01);
(Continued)

(58) Field of Classification Search
CPC ................................ F21K 9/50; F21V 29/50
See application file for complete search history.

(56) References Cited

U.S. PATENT DOCUMENTS 5,489,771 A      2/1996  Beach et al.
6,045,240 A *   4/2000  Hochstein ............ B60Q 1/2696
                                                                    362/249.06
(Continued)

FOREIGN PATENT DOCUMENTS

CN     101390451 A    3/2009
CN     100565946 C   12/2009
(Continued)

OTHER PUBLICATIONS

International Search Report issued for PCT/EP2013/060896 dated Jul. 12, 2013.
(Continued)

*Primary Examiner* — Sharon Payne
(74) *Attorney, Agent, or Firm* — Viering Jentschura & Partner MBB

(57) ABSTRACT

The invention relates to a lighting device (11; 31; 41; 51) which is equipped with a plurality of semiconductor light sources (14, 15) of different colors, downstream of which a common diffusor (17) is arranged, wherein the lighting device (11; 31; 41; 51) has at least one light sensor (21) optically coupled to the diffusor (17).

7 Claims, 5 Drawing Sheets

(51) Int. Cl.
*F21V 23/04* (2006.01)
*F21V 29/50* (2015.01)
*F21K 9/60* (2016.01)
*F21K 9/61* (2016.01)
*F21Y 115/30* (2016.01)
*F21Y 115/10* (2016.01)

(52) U.S. Cl.
CPC ........... *F21V 29/50* (2015.01); *F21Y 2115/10* (2016.08); *F21Y 2115/30* (2016.08); *G02B 6/0051* (2013.01)

(56) References Cited

U.S. PATENT DOCUMENTS

| | | | |
|---|---|---|---|
| 7,649,161 | B2 | 1/2010 | Keh et al. |
| 7,652,236 | B2* | 1/2010 | Cortenraad ........ H05B 33/0869 250/205 |
| 7,767,948 | B2* | 8/2010 | May ................. G01J 3/0254 250/205 |
| 8,237,381 | B2* | 8/2012 | Harbers ............. H05B 33/0803 315/149 |
| 8,322,883 | B2* | 12/2012 | Cleaver ................. F21K 9/00 362/249.02 |
| 8,851,731 | B2* | 10/2014 | Zhang ................... F21V 9/16 362/311.02 |
| 2002/0043926 | A1* | 4/2002 | Takahashi ............. C03C 3/045 313/503 |
| 2002/0130326 | A1 | 9/2002 | Tamura et al. |
| 2005/0200315 | A1 | 9/2005 | Kwong et al. |
| 2006/0268543 | A1* | 11/2006 | Rains, Jr. ................. F21S 2/00 362/231 |
| 2007/0007898 | A1 | 1/2007 | Bruning |
| 2007/0267976 | A1* | 11/2007 | Bohler .................. B82Y 10/00 315/112 |
| 2008/0093530 | A1 | 4/2008 | Hoelen et al. |
| 2008/0094835 | A1* | 4/2008 | Marra ................. F21S 48/1394 362/247 |
| 2009/0103296 | A1* | 4/2009 | Harbers ................... F21V 7/22 362/234 |
| 2010/0134047 | A1 | 6/2010 | Hasnain |
| 2011/0001431 | A1 | 1/2011 | Brukilacchio |
| 2012/0105402 | A1 | 5/2012 | Huang |

FOREIGN PATENT DOCUMENTS

| | | |
|---|---|---|
| CN | 101915365 A | 12/2010 |
| CN | 102096520 A | 6/2011 |
| CN | 102096521 A | 6/2011 |
| CN | 102155672 A | 8/2011 |
| CN | 102414504 A | 4/2012 |
| CN | 102456325 A | 5/2012 |
| CN | 102893701 A | 1/2013 |
| DE | 102008021871 A1 | 11/2008 |
| DE | 102008016095 A1 | 10/2009 |
| EP | 1988752 A1 | 11/2008 |
| EP | 2395816 A1 | 12/2011 |
| TW | 201212709 A | 3/2012 |
| WO | 2004100213 A2 | 11/2004 |
| WO | WO 2008/086890 A1 * | 7/2008 ............ G02B 26/08 |
| WO | 2012149579 A2 | 11/2012 |

OTHER PUBLICATIONS

Office Action issued for parallel German patent application No. 102012209131.9 dated May 24, 2013.
Chinese Office Action based on Application No. 201380028927.X (8 Pages and 5 Pages of English translation) dated Oct. 26, 2015.

\* cited by examiner

LIGHTING DEVICE HAVING SEMICONDUCTOR LIGHT SOURCES AND A COMMON DIFFUSOR

RELATED APPLICATIONS

The present application is a national stage entry according to 35 U.S.C. § 371 of PCT application No.: PCT/EP2013/060896 filed on May 27, 2013, which claims priority from German application No.: 10 2012 209 131.9 filed on May 31, 2012, and is incorporated herein by reference in its entirety.

TECHNICAL FIELD

Various embodiments relate to a lighting device including a plurality of semiconductor light sources of different colors, downstream of which a common diffuser is disposed. The disclosure is applicable in particular to lighting modules.

BACKGROUND

Lighting modules constructed with light emitting diodes (LEDs) of different colors do not have a constant cumulative color locus over their operating life, to be precise on account of temperature-dependent changes in brightness and different ageing of the LEDs depending e.g. on the material system used.

In order to keep the cumulative color locus constant and thus in order to compensate for or readjust changes in brightness of individual LEDs, the related art involves detecting light at a specific geometrical position in the optical system, said light containing if possible the light from all light sources of the same color. The detection usually takes place by means of a brightness or color sensor. Only in rare cases is it possible to realize a point-symmetrical LED arrangement with a central sensor, in which arrangement the propagation paths of the light rays from individual LEDs are of the same length and thus lead to comparable signal strengths at the sensor, as a result of which a compensation can be carried out particularly reliably. This method is no longer applicable, however, in the case of lighting modules in which the LEDs are potted in a common diffuser. Moreover, this method is no longer usable in practice for small lighting modules having very short mean free path lengths (MFP).

SUMMARY

Various embodiments provide a simple and reliable possibility for setting, in particular keeping constant, a cumulative color locus of a lighting device mentioned as relevant.

Various embodiments provide a lighting device including a plurality of semiconductor light sources of different colors, downstream of which a common diffuser is disposed, wherein the lighting device has at least one light sensor optically coupled to the diffuser.

By tapping off a (typically small) part of the light mixed in the diffuser (and, if appropriate, guiding this tapped-off part) to the at least one light sensor, even light from semiconductor light sources situated very close to one another and having small mean free path lengths can be reliably coupled out and subsequently detected. This makes use of the property of the diffuser that in the latter effective light mixing of the light emitted by the semiconductor light sources already occurs in a small volume and, consequently, highly accurate sensor positioning is not required.

The lighting device can be a lighting module, e.g. also a lamp or a luminaire.

In various embodiments, the semiconductor light sources include at least one light emitting diode and/or at least one semiconductor laser. A color can be monochromatic (e.g. red, green, blue, etc.) or multichromatic (e.g. white). Moreover, the light emitted by the at least one semiconductor light source can be infrared light (e.g. generated by means of an IR LED) or ultraviolet light (e.g. generated by means of a UV LED). The at least one semiconductor light source can contain at least one wavelength-converting phosphor (e.g. in the form of a conversion LED). The at least one semiconductor light source can be present in the form of at least one individually packaged semiconductor light source or in the form of at least one chip, e.g. LED chip. A plurality of chips can be mounted on a common substrate ("submount"). The chips can be mounted in particular using bare chip mounting technology ("chip-on-board" technology; CoB technology) and then form a chip module, in particular. Instead of or in addition to inorganic light emitting diodes, e.g. based on InGaN or AlInGaP, generally organic LEDs (OLEDs, e.g. polymer OLEDs) can also be used.

A plurality of semiconductor light sources of different colors can be understood to mean, e.g., a plurality of semiconductor light sources, of which at least two semiconductor light sources emit light of different colors or spectral distributions. The plurality of semiconductor light sources of different colors can form in particular two or more groups of semiconductor light sources, wherein semiconductor light sources of the same group emit light of the same color and can be constructed in an identical fashion, in particular, and semiconductor light sources of different groups emit light of different colors and can be constructed differently, in particular.

The semiconductor light sources can for example have two different colors (e.g. mint-colored/greenish-white-colored and amber-colored in the so-called "brilliant mix"), have three different colors (e.g. red, green and blue or a brilliant mix having an additional red color), have four different colors (e.g. red, green and blue and amber-colored) or have even more different colors. The number of semiconductor light sources can for example be different for each color or may be the same for at least two colors.

The common diffuser may be, e.g., a light-transmissive, translucent body. The body can also be regarded as a diffuse or light-scattering body.

The common diffuser can be a component which is produced separately and bears on the semiconductor light sources or is arranged in a manner spaced apart therefrom. The common diffuser can alternatively be a potting material with which the semiconductor light sources, in particular chips, are potted or embedded.

The material of the common diffuser may be, in particular, a transparent basic material, e.g. silicone, epoxy resin, polymethyl methacrylate (PMMA), cyclo-olefin copolymer (COC) or polycarbonate (PC), which includes light-scattering particles (e.g. composed of aluminum oxide, titanium oxide, etc.) as filling material.

The fact that the at least one light sensor is optically coupled to the diffuser means, in particular, that the light sensor is designed and arranged to detect light emerging from the diffuser. For this purpose, the at least one light sensor can contact the diffuser in particular directly.

Alternatively, the at least one light sensor may be optically connected to the diffuser by way of at least one optical waveguide. For this purpose, an optical waveguide may, in particular, at one end optically couple to the diffuser, e.g.

contact the latter, and at the other end couple to at least one light sensor, e.g. contact the latter.

The optical waveguide may be, e.g., a branched optical waveguide which contacts the diffuser for example at a plurality of different locations and converges upstream of or at a light sensor. As a result, the light sensor can detect light mixed from different locations of the diffuser, which improves a spatial independence of the light measurement. The branched optical waveguide can also be regarded and designated as an optical waveguide network. In other words, the light passing in the diffuser can be coupled out or tapped off in a targeted manner at one or a plurality of locations and can be guided, in particular in a manner free of losses, to at least one light sensor.

The at least one light sensor may include exactly one light sensor or may include a plurality of light sensors. The at least one light sensor may include at least one color sensor and/or at least one brightness sensor. The color sensor has the advantage that it can simultaneously resolve light of different wavelengths. A color-selective brightness measurement by means of the brightness sensor can be achieved for example by means of at least partly temporally different driving of the semiconductor light sources, which can be operated e.g. in PWM operation for this purpose. It is then possible, in particular, to equate a light signal at the brightness sensor with a light emission of a specific type of semiconductor light sources and to evaluate it accordingly. This is less expensive than the use of a color sensor. Moreover, a reliable identification of the light from different semiconductor light sources with significantly overlapping light spectra is thus possible.

In one development, the semiconductor light sources are arranged on a substrate or carrier (typically on a "front side" of the substrate) and are potted with a potting material serving as the diffuser. This produces a compact design. The semiconductor light sources, e.g. LEDs, can be present in particular as chips, e.g. LED chips, and can be fixed in particular by means of bare chip mounting on the substrate. Such a lighting device can be present in particular as a CoB lighting device, in particular CoB module.

The substrate can be for example a printed circuit board, e.g. composed of FR4 or CEM, embodied as a metal-core circuit board or as an insulated metal substrate (IMS), etc.

In one configuration thereof, the substrate has at least one optical via ("coupling-out via"), which constitutes an optical waveguide or optical waveguide section running through the substrate. This enables light to be coupled out from the diffuser in a targeted manner (e.g. from a top side of the substrate) and enables the light to be guided to the other side (e.g. an underside) of the substrate. In this regard, the coupling-out of light can be achieved without shading of the useful light emitted by the lighting device. For this purpose, the coupling-out via couples locally or discretely optically to the diffuser and is arranged in particular alongside a placement site for a semiconductor light source. In this configuration, therefore, the at least one light sensor can be positioned in particular outside the semiconductor light sources and may thus be shielded from direct incidence of light from the semiconductor light sources and/or from the diffuser. This therefore affords the advantage that the light sensor is protected against being overdriven, on account of the typically very high luminances in the diffuser, in a simple manner (e.g. by the choice of a cross-sectional area of the optical via(s)).

The light sensor can generally be situated separately on its own, dedicated carrier or substrate, e.g. a printed circuit board.

In one development, a diameter of a coupling-out via is preferably in a range of between 100 micrometers and 800 micrometers, in particular in a range of between 200 micrometers and 500 micrometers.

The optical via can be configured in particular as a hole or through hole in the substrate, said hole or through hole being filled with a light-guiding, in particular transparent, material. Plastic (e.g. epoxy resin, silicone, PC, COC, PMMA, etc.), in particular, can be used as light-guiding material. Alternatively, the hole may be hollow or filled with air.

In one development, a respective optical coupling-out via is assigned to each semiconductor light source. Such a coupling-out via may be arranged in particular near the assigned semiconductor light source. In this regard, particularly accurate readjustment of individual semiconductor light sources can be achieved.

In another configuration, a common optical coupling-out via is assigned to a plurality of semiconductor light sources. In this regard, readjustment of individual semiconductor light sources can be achieved with a low outlay.

In one development thereof, the common coupling-out via is arranged at corner points or in the center of the corner points of the assigned semiconductor light sources, e.g. at a centroid of the corner points.

In another development thereof, the plurality of semiconductor light sources form a plurality of groups of semiconductor light sources (that is to say that a common coupling-out via is assigned to each group) and each group has an identical number and type of semiconductor light sources. A type of semiconductor light sources is understood to mean, in particular, semiconductor light sources of the same color. This enables, in a simple manner, accurate driving and adaptation of the brightness of the semiconductor light sources in order to set, in particular keep constant, the color locus.

Cartesian, hexagonal or rotationally symmetrical arrangements of semiconductor light sources and optical via may be possible.

In one development, moreover, the individual semiconductor light sources are settable in terms of their brightness separately or independently of one another. By way of example, for this purpose, an operating current of each semiconductor light source may be individually settable, to be precise in particular of those semiconductor light sources whose change in brightness with temperature and/or lifetime deviates significantly from an expected average behavior. This development enables particularly accurate readjustment of the color locus. The setting of the brightness by means of the operating current can include a setting of a magnitude or intensity of the operating current and/or, e.g. in pulse width operation, a pulse width of an electrical signal. By means of targeted setting of the operating current of the individual semiconductor light sources, it is possible to compare a light source with the average of all light sources of the same color.

In another configuration, the at least one coupling-out via is coupled, in particular connected, to a common, in particular branched, optical waveguide ("continuation optical waveguide") at its side facing away from the semiconductor light sources and the diffuser (which side is designated hereinafter as the "rear side of the substrate" without restricting the generality). Said continuation optical waveguide runs to the at least one, in particular to exactly one, light sensor. The continuation optical waveguide is thus able to concentrate the light guided through the coupling-out vias in a manner free of losses and to guide it to the at least one light sensor.

In one development, the continuation optical waveguide may be integrated into the substrate, in particular run within the substrate.

In another development, the continuation optical waveguide may be arranged, in particular applied, on that surface of the substrate which faces away from the semiconductor light sources and the diffuser (which surface is designated hereinafter as the "rear side of the substrate" without restricting the generality).

The continuation optical waveguide may include e.g. transparent plastic such as PC, epoxy resin, silicone, PMMA, COC, etc.

In yet another configuration the substrate has a further optical via ("coupling-in via"), which is coupled to the optical waveguide on the rear side (on a rear side of the substrate) and is coupled to the light sensor on the front side (on a front side of the substrate). In this case, therefore, the light sensor is arranged on the substrate, in particular on the front side thereof. The light sensor, with its light-sensitive area, in particular, can then face in the direction of the substrate and the coupling-in via and can be optically coupled to the further coupling-in via. For this purpose, the light sensor may be mounted on the substrate for example in a flip-chip fashion and may therefore be present as a flip-chip element. This configuration enables simplified production of all components on a substrate. The optical waveguide is therefore optically connected to at least one coupling-out via at one end and to at least one coupling-in via at the other end. The light tapped off from the diffuser is therefore passed through the substrate twice. The coupling-in via can also be designated as an "inverse" optical via in relation to light guiding.

The at least one coupling-out via, the continuation optical waveguide and/or (if present) the coupling-in via can constitute different sections of the optical waveguide. The at least one coupling-out via, the continuation optical waveguide and/or the coupling-in via can be produced separately and be optically coupled to one another, e.g. contact one another, e.g. also be adhesively bonded to one another. Alternatively, the at least one coupling-out via, the continuation optical waveguide and/or the coupling-in via can be embodied integrally.

In one configuration, moreover, at least one optical via (coupling-out via and/or coupling-in via) is embodied as a heat conducting element. Such an optical via may therefore also be embodied as a "thermal via". This results in a double benefit, since the vias, in addition to guiding light through them, also contribute to dissipating heat from the light source arrangement, which contributes to better operating conditions and/or an increased power of the lighting device. Such an optical via can have for example a metallic sleeve, e.g. a small tube, which is inserted into the hole. The sleeve can be hollow or empty or filled with transparent material.

In one development, the semiconductor light sources are surrounded laterally circumferentially by a hollow body open at the top side and the underside, said hollow body being designated hereinafter as "lateral wall". The lateral wall facilitates dimensionally accurate filling of a potting material serving as the diffuser, in particular with a desired filling level. The lateral wall and the substrate can therefore form a mold, in particular a potting vessel. Moreover, the lateral wall can serve as a diaphragm and/or as a reflector, whereby a light beam emitted by the lighting device can be shaped more flexibly.

The lateral wall bears or is seated preferably on the substrate (in the sense of an attachment element) and may be fitted thereto e.g. in a force locking manner (e.g. by clamping), in a positively locking manner (e.g. by latching) and/or cohesively (e.g. by adhesive bonding). The lateral wall can be embodied in particular in the form of a sleeve or tube. The lateral wall may have a circular cross-sectional shape, in particular, but is not restricted thereto and may alternatively have a polygonal basic shape (e.g. a triangular basic shape, a square basic shape or a basic shape like some other polygonal progression). Moreover, e.g. cross-sectionally oval or freeform-shaped lateral walls can be used.

In one development which is preferred for obtaining a high luminous efficiency, with the presence of a lateral wall, the latter's inner side facing the semiconductor light sources and the diffuser is embodied as specularly or diffusely reflective, e.g. in a manner similar or identical to the front side of the substrate. Alternatively, the inner side of the lateral wall may be embodied as absorbent. For this purpose, the lateral wall may be equipped with a coating or a film on the inner side. Alternatively, the wall itself (that is to say, in particular, its main body) may be configured as reflective or absorbent, such that a dedicated coating or film can be dispensed with. By way of example, white plastic or white ceramic can then be used as materials, the ceramic having the advantage of a high thermal conductivity.

In another development which is preferred for obtaining a high luminous efficiency, that surface of the substrate on which the semiconductor light sources and the diffuser are arranged (which surface is designated hereinafter as the "front side of the substrate" without restricting the generality), outside the optical via(s), is at least partly reflectively coated. The reflective coating may be specularly or diffusely reflective. A diffusely reflective coating may be for example a white coating, e.g. including aluminum oxide, silicon oxide or titanium oxide. The reflectivity is preferably more than 75%, particularly preferably more than 90%.

In yet another configuration, a light-transmissive optical waveguide is disposed optically downstream of the diffuser, which optical waveguide leads or runs to the at least one light sensor, wherein the optical waveguide has a higher refractive index than the diffuser. The fact that the optical waveguide is disposed optically downstream of the diffuser can mean, in particular, that the optical waveguide is introduced in a useful light beam emitted by the diffuser, to be precise partly or wholly. If the (mixed) light sufficiently homogenized in terms of brightness and color by means of the diffuser emerges from the diffuser and subsequently enters the optical waveguide having a higher refractive index, an optical waveguide condition for the propagation of light at very shallow angles with respect to the surface is fulfilled in the optical waveguide. Consequently, light incident at very shallow angles is guided in the optical waveguide, to be precise at least largely in a manner free of losses (i.e. independently of the length of the optical waveguide), by means of total internal reflection, TIR, to the at least one light sensor. The light thus coupled out typically includes only a fraction of the light radiated into the optical waveguide, while the majority of the light is transmitted through said optical waveguide. Said optical waveguide is therefore also called "transmission optical waveguide" hereinafter. This configuration has the advantage that it is particularly simple to implement and enables light to be tapped off over a large area.

In one development, an absolute difference in refractive index between the diffuser and the transmission optical waveguide is at least 0.005, preferably at least 0.01.

The transmission optical waveguide may include or consist of, for example, transparent plastic such as PC, epoxy resin, silicone, PMMA, COC, etc., or glass or glass ceramic.

In one configuration, the transmission optical waveguide bears directly on a free surface of the diffuser. A free surface can be understood to mean, in particular, a surface which would not be covered without the transmission optical waveguide. A free surface can also be understood to mean a surface at which (mixed) useful light emerges. In particular, the transmission optical waveguide may be embodied at least regionally as a light-transmissive layer bearing on the diffuser.

In one development, the transmission optical waveguide is arranged at least partly in a lateral wall. This facilitates positioning of the transmission optical waveguide.

In particular, the semiconductor light sources can be surrounded laterally circumferentially by a lateral wall and the diffuser can be or consist of a potting material with which the semiconductor light sources are potted or embedded. In this case, in particular, the diffuser may not extend as far as the upper (free) edge of the lateral wall or may not have been filled to that point, which facilitates simple positioning of the transmission optical waveguide within the sleeve.

In one development, the transmission optical waveguide is a separately produced or preformed body which is inserted into the lateral wall and in particular placed onto the diffuser. In an alternative development, the transmission optical waveguide is present as potting material and is molded at least partly into the lateral wall onto the diffuser.

In particular, the diffuser and that part or region of the transmission optical waveguide which bears thereon may have been produced or filled in a common molding method and may be present e.g. as a two-component injection-molded body.

In one preferred development, the transmission optical waveguide has a height or thickness (in particular corresponding to a distance between the diffuser and the upper edge of the sleeve) of less than or equal to 1 millimeter, in particular of less than or equal to 0.5 millimeter.

In one configuration, furthermore, the transmission optical waveguide is situated opposite and at a distance, in particular with a gap, from a free surface of the diffuser. This has the advantage, for example, that production and handling of said optical waveguide are particularly simple and e.g. a direct material transition between the diffuser and the optical waveguide (e.g. a silicone/silicone transition) can be avoided. Moreover, a proportion of the light that is incident in the transmission optical waveguide at a small angle with respect to the surface and is then tapped off can be set by the gap width or the distance.

In one development, the transmission optical waveguide is embodied as plate- or disk-shaped at least in a region that can be irradiated by the diffuser. This supports areally uniform guiding of light.

In one configuration, furthermore, the transmission optical waveguide has scattering particles, in particular in a low concentration, at least in a region that can be irradiated by the diffuser. As a result, in an amplified and/or targeted manner, light can be coupled into the transmission optical waveguide for forwarding to the at least one light sensor.

This configuration can be used advantageously in particular for the case where the transmission optical waveguide is arranged in a manner spaced apart from the diffuser, since a reduction of the coupled-out light on account of the spacing can thus be compensated for and even overcompensated for. Without scatterers or scattering particles, by contrast, in the case of a comparatively high distance, the situation could occur that practically the entire light coupled into the (in particular disk-shaped) optical waveguide from the diffuser also emerges again or passes through owing to the plane-parallel outer surfaces of said optical waveguide. Since a size, property and concentration of scattering particles can be set very accurately, particularly uniform or reproducible coupling-out of light and thus feeding of light to the light sensor can be achieved by this configuration.

In one development in this case, moreover, the scattering particles include or are aluminum oxide, silicon oxide and/or titanium oxide.

In one development, furthermore, a concentration of the scattering particles in the transmission optical waveguide is at least 1000 particles per cubic millimeter, in particular at least 10 000 particles per cubic millimeter.

The transmission optical waveguide disposed optically downstream of the diffuser may have in particular at least one region or part which branches off from the region that can be irradiated by the diffuser and which leads to the at least one light sensor. This branching-off region may lead for example through or by way of the lateral wall.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
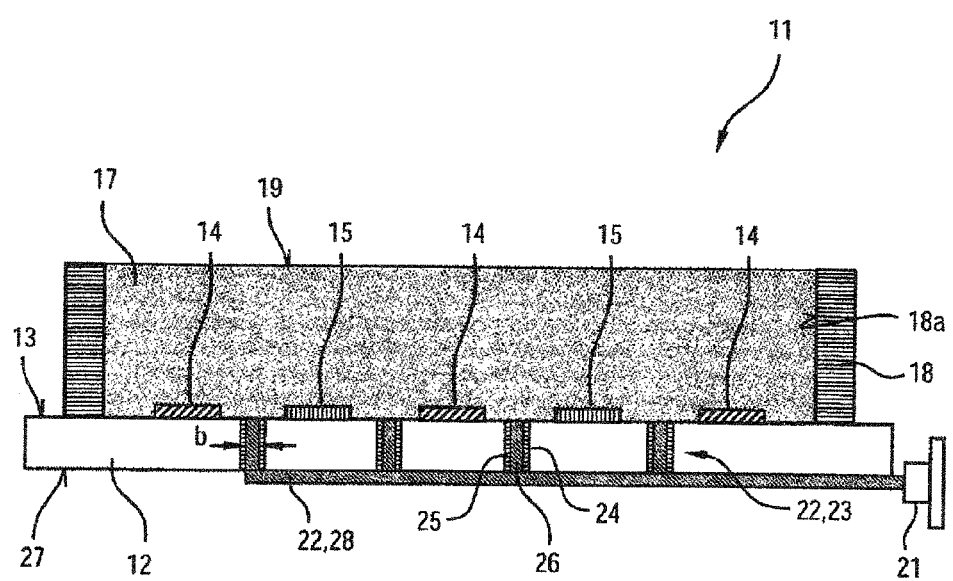
FIG. 1 shows a lighting device in accordance with a first embodiment as a sectional illustration in side view.

FIG. 1 shows a lighting device 11 in accordance with a first embodiment as a sectional illustration in side view.

The lighting device 11 has a substrate in the form of a printed circuit board 12, a plurality of semiconductor light sources of different colors in the form of red-emitting LED chips 14 and greenish-white- or mint-colored-emitting LED chips 15 being arranged on the front side 13 of said printed circuit board. Disposed downstream of the LEDs 14 and 15 there is a common diffuser in the form of a diffusely scattering potting compound 17, the LED chips 14 and 15 being embedded into said potting compound 17. The potting compound 17 may include for example transparent silicone or epoxy resin as basic or matrix material, into which scattering particles in the form of aluminum oxide, silicon oxide or titanium oxide are embedded as filling material.

The lighting device 11 can have been produced in particular by means of a chip-on-board method. In this case, the LED chips 14 and 15 can be electrically connected to the printed circuit board for example by wire bonding or a flip-chip technique.

A lateral wall 18 in the form of a hollow-cylindrical tube (having an e.g. circular cross section, square cross section or cross section like a polygonal progression) is placed on the front side 13 of the printed circuit board 12, said lateral wall circumferentially surrounding the LED chips 14 and 15. The printed circuit board 12 and the lateral wall 18 thereby form a vessel for filling in and accommodating the potting compound 17 at the top side.

During operation of the lighting device 11, the LED chips 14 and 15 radiate their light into the potting compound 17, where the light is mixed and emerges as (mixed, e.g. white) useful light at least for the most part at a free surface 19. In order to obtain a high luminous efficiency, an inner side 18a of the lateral wall 18 is embodied as diffusely reflective, e.g. coated white with aluminum oxide, silicon oxide or titanium oxide. For the same purpose, the front side 13 of the printed circuit board 12 (at least outside the placement sites of the LED chips 14 and 15 and the coupling-out vias 23 described further below) is also diffusely reflectively coated. A reflectivity of the inner side 18a and of the front side 13 is more than 90% here.

The mixed useful light ideally has a cumulative color locus that is the same over the area of the free surface 19. However, a global and/or local change in the cumulative color locus can occur for example on account of a different temperature dependence of the LED chips 14 and 15 and/or on account of age-dependent degradation effects.

For the purpose of monitoring and, if appropriate, changing or keeping constant the cumulative color locus, the lighting device 11 additionally has a light sensor in the form of a color sensor 21, which is able to resolve the red and respectively greenish-white/mint-colored light component of the mixed light generated by means of the LED chips 14 and 15 in the potting compound 17 with regard to its brightness. For the purpose of optical coupling to the mixed light to be monitored, the color sensor 21 is optically coupled or connected to the potting compound 17 by way of an optical waveguide 22.

For this purpose, to put it more precisely, the printed circuit board 12 has a plurality of optical vias (coupling-out vias 23) which extend through its height and which constitute a part of the optical waveguide 22. On the top side or in the region of the front side 13 of the printed circuit board 12, the coupling-out vias 23 areally contact the potting compound 17 serving as a diffuser and thereby enable coupling-out of a (typically slight) part of the mixed light mixed in the potting compound 17.

The coupling-out vias 23 each have a metallic, hollow-cylindrical sleeve 25 inserted in a through hole 24 of the printed circuit board 12, said sleeve being filled with a transparent material 26. The sleeve 25 enables a thermal connection between the front side 13 (and thus the potting material 17) and a rear side 27 of the printed circuit board 12 and can thus serve as a heat conducting element. The transparent material 26 can have in particular a cross-sectional width b of 100 to 800 micrometers, preferably of 200 to 500 micrometers. A cross-sectional shape is arbitrary, in principle. In order to suppress transition losses, the transparent material 26 preferably corresponds to the basic material of the potting compound 17 (and therefore has an identical refractive index and thus avoids material-governed mismatches at the interface or contact area).

In the region of the rear side 27 of the printed circuit board 12, the coupling-out vias 23 are optically coupled to a common optical waveguide (continuation optical waveguide 28) arranged there. The continuation optical waveguide 28 is a further part or a section of the optical waveguide 22. The continuation optical waveguide 28 leads from the coupling-out vias 23 to the color sensor 21. The position of the color sensor 21 is arbitrary, in principle. The color sensor 21 can advantageously be situated on the front side 13 of the printed circuit board 12 for the purpose of simple placement.

Figure 2:
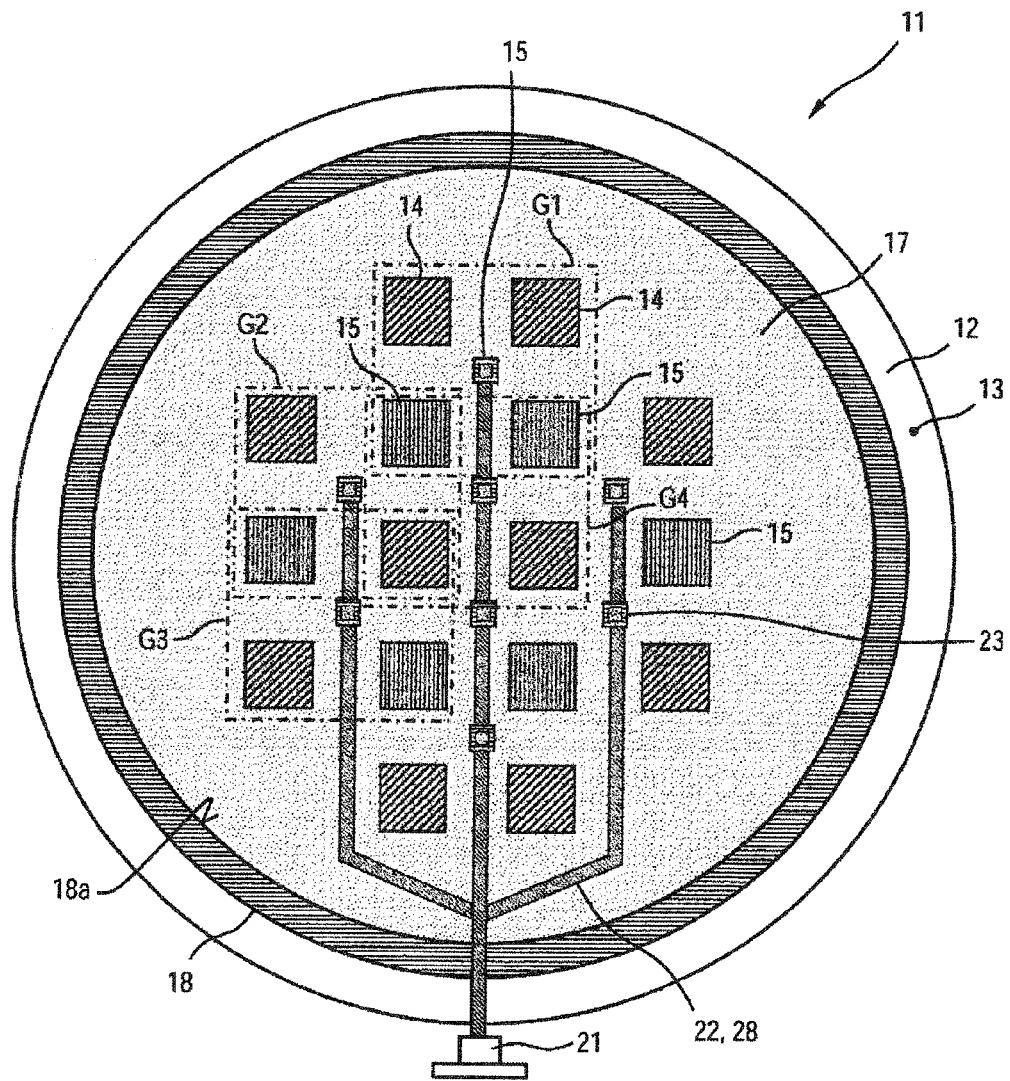
FIG. 2 shows the lighting device in accordance with the first embodiment in plan view.

As shown in plan view in FIG. 2, the coupling-out vias 23 are arranged such that a common optical coupling-out via 23 is assigned to a plurality of LED chips 14 and 15. For this purpose, a respective common coupling-out via 23 is assigned to a geometrical centroid of the corner points of the (associated) LED chips 14 and 15 surrounding it. To put it more precisely, the LED chips 14 and 15 form a plurality of groups G1 to G4, here four illustrated in a manner picked out by way of example, such that a common coupling-out via 23 is assigned to each group G1 to G4 in its center. Each of the groups G1 to G4 has an identical number and type of two red LED chips 14 and two greenish-white LED chips 15. By setting the operating current of the individual LED chips 14 and 15 in a targeted manner, it is possible to compare an LED chip 14 or 15 with the average of all LED chips 14 or respectively 15 of the same color and to carry out a corresponding adaptation of the operating current and thus of the brightness in order to keep the cumulative color locus constant. For this purpose, the LED chips 14 and 15 can be set separately or independently of one another in terms of their brightness.

The continuation optical waveguide 28 is a branched optical waveguide which converges in the direction of the color sensor 21. The continuation optical waveguide 28 can thus concentrate the light guided through all the coupling-out vias 23 in a manner free of losses and guide it jointly to the light sensor 21.

Generally, one LED chip, e.g. 14 or 15, may be assigned to one or a plurality of the coupling-out vias 23.

Moreover, generally e.g. different groups of LED chips 14 and/or 15 can be assigned to the coupling-out vias 23. Moreover, just a single coupling-out via 23 may be present.

Figure 3:
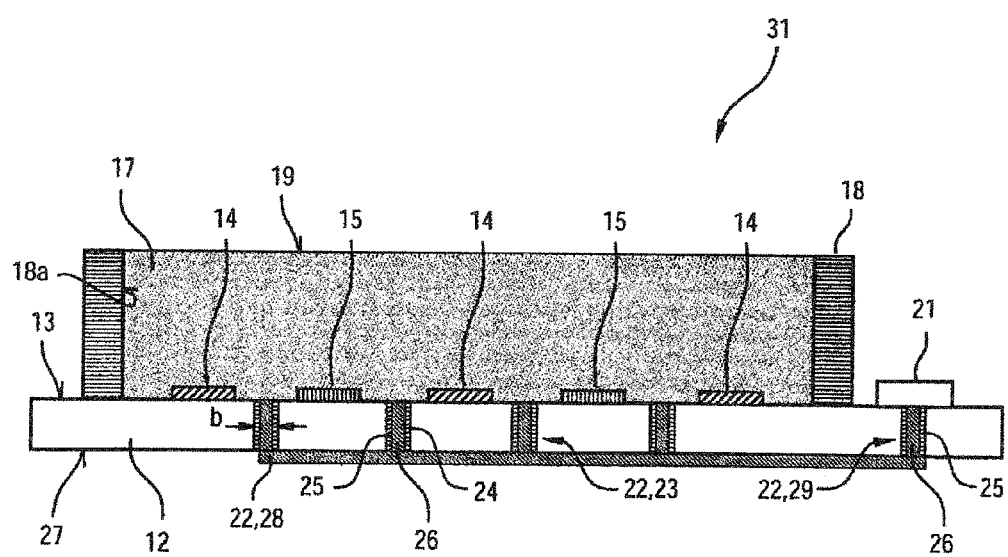
FIG. 3 shows a lighting device in accordance with a second embodiment as a sectional illustration in side view.

FIG. 3 shows a lighting device 31 in accordance with a second embodiment as a sectional illustration in side view. The lighting device 31 is constructed similarly to the lighting device 11, but now has a coupling-in via 29 led through the printed circuit board 12. The coupling-in via 29 can be embodied identically or similarly to a coupling-out via 23 and can form a part of the optical waveguide 22.

At the front side 13 of the printed circuit board 12, the coupling-in via 29 is covered by the color sensor 21 now fitted there, such that a part of the mixed light passing in the potting compound 17 is coupled out through the coupling-out vias 23 and can be guided or directed further through the continuation optical waveguide 28 and the coupling-in via 29 to the color sensor 21, which detects the coupled-out light. For this purpose, the color sensor 21 can be fixed on the printed circuit board 12 in particular using flip-chip technology.

Figure 4:
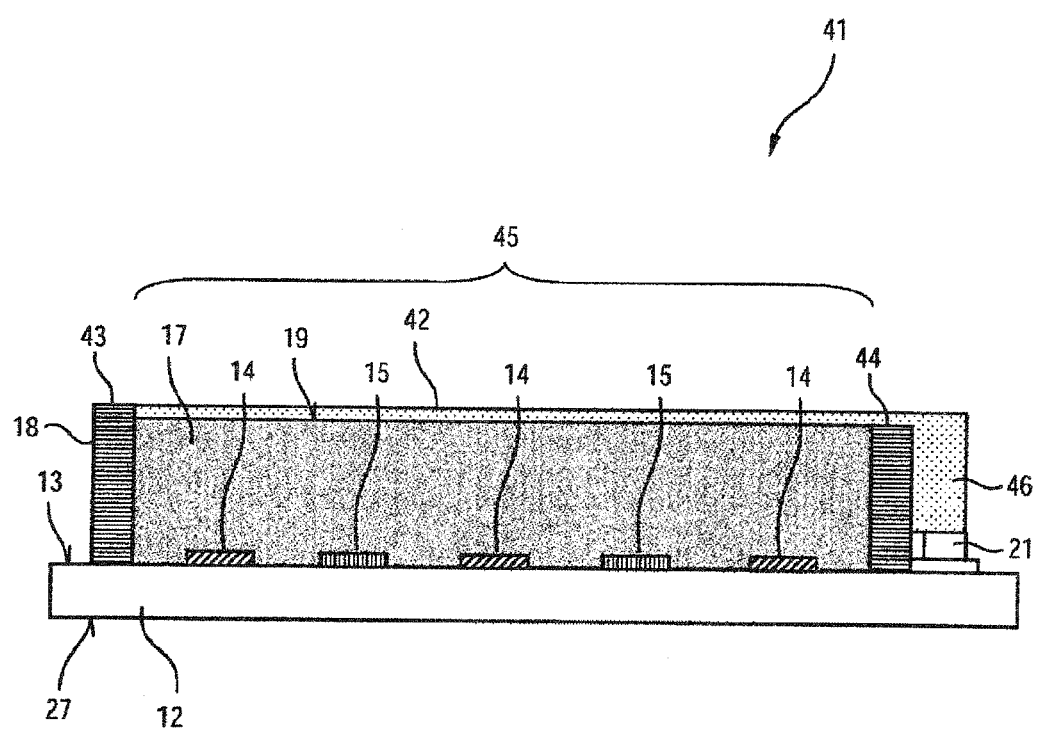
FIG. 4 shows a lighting device in accordance with a third embodiment as a sectional illustration in side view.

FIG. 4 shows a lighting device 41 in accordance with a third embodiment as a sectional illustration in side view. The lighting device 41 is constructed similarly to the lighting device 11, but has neither optical vias 23 or 29 nor the continuation optical waveguide 28 arranged therebetween.

Rather, the lighting device 41 has an optical waveguide (transmission optical waveguide 42) which here bears on the top side on the potting compound 17 serving as a diffuser (to put it more precisely on the light-emitting free surface 19) and is thus also disposed optically downstream of the potting compound 17. The transmission optical waveguide 42 runs through a longitudinal groove 44 present at an upper edge 43 of the lateral wall 18 to the color sensor 21 arranged outside the lateral wall 18. The transmission optical waveguide 42 therefore has a region 45 that can be irradiated by the potting compound 17 or is capable of transmission of the light emerging from said potting compound. This region 45 capable of transmission is embodied as disk- or plate-shaped with plane-parallel top side and underside and bears on the potting compound 17 within the lateral wall 18. The transmission optical waveguide 42 furthermore has, adjacent to the region 45 capable of transmission, a region (outer region 46) which is not directly irradiatable and which leads to the color sensor 21. The color sensor 21 is fitted here on the printed circuit board 12.

In contrast to the lighting devices 11 and 31 described above, the potting compound 17 is not filled as far as the upper edge of the lateral wall 18, but rather is at a distance therefrom of less than or equal to 1 millimeter, in particular of less than or equal to 0.5 millimeter. The transmission optical waveguide 42 terminates here purely by way of example flush at the upper edge 43 and thus has a thickness of between in particular 0.5 mm and 1 mm.

At least the region 45 capable of transmission has a refractive index that is higher than the refractive index of the potting compound 17 or the basic material thereof, in particular higher at least by a value of 0.005, preferably at least by a value of 0.01. The transmission optical waveguide 42 may consist e.g. of transparent plastic such as PC, epoxy resin, silicone, PMMA, COC, etc., or glass or glass ceramic.

The transmission optical waveguide 42 can consist in particular of a transparent basic material to which scattering particles are added in a low concentration, e.g. of at least 10 000 particles per cubic millimeter, at least in the region 45 capable of transmission. The particle concentration may generally not exceed in particular 25 000, in particular 50 000, in particular 100 000, particles per cubic millimeter. The presence of these particles amplifies a branching-off or tapping-off and thus coupling-out of the (mixed) light radiated into the transmission optical waveguide 42 from the potting compound 17 into the outer region 46 and further to the color sensor 21 under total internal reflection. However a majority of the light radiated into the transmission optical waveguide 42 is still transmitted and can thus be used as useful light.

Alternatively, the outer region 46 of the optical waveguide 42 may run through the lateral wall 18, e.g. be integrated therein. In another alternative, the outer region 46 of the optical waveguide 42 may be embodied as an optical via analogously for example to the via 23, e.g. as a hollow channel or channel filled with transparent material.

During the operation of the lighting device 41, the light from the LED chips 14 and 15 is mixed in the potting compound 17. Brightness and color are sufficiently homogenized at the free surface 19 of the potting compound 17. Here the (mixed) light then enters the region 45 capable of transmission—said region having a higher refractive index—of the transmission optical waveguide 42, which fulfills an optical waveguide condition for the propagation of light at very shallow angles with respect to the surface. The light entering the region 45 capable of transmission of the transmission optical waveguide 42 originates from the entire free surface 19 of the potting compound 17 and is guided in a manner free of losses (independently of the distance to the outer region 46 of the optical waveguide 42) by means of total internal reflection (TIR). By virtue of the (optional) scattering particles in the region 45 capable of transmission of the transmission optical waveguide 42, light can be guided in a targeted manner from different locations with the fulfillment of the optical waveguide condition in the optical waveguide 42. In particular also by setting the concentration of the scattering particles in the region 45 capable of transmission, it is possible to set a sensor signal of the color sensor 21 to a desired operating level.

The areal coupling-out of mixed light from the entire free surface 19 of the potting compound 17 and the guiding to the color sensor 21 in a manner free of losses result in a particularly representative sensor signal in which all LED chips 14 and 15 are represented with equal strength or in a comparable ratio of their own brightnesses in the sensor signal.

Figure 5:
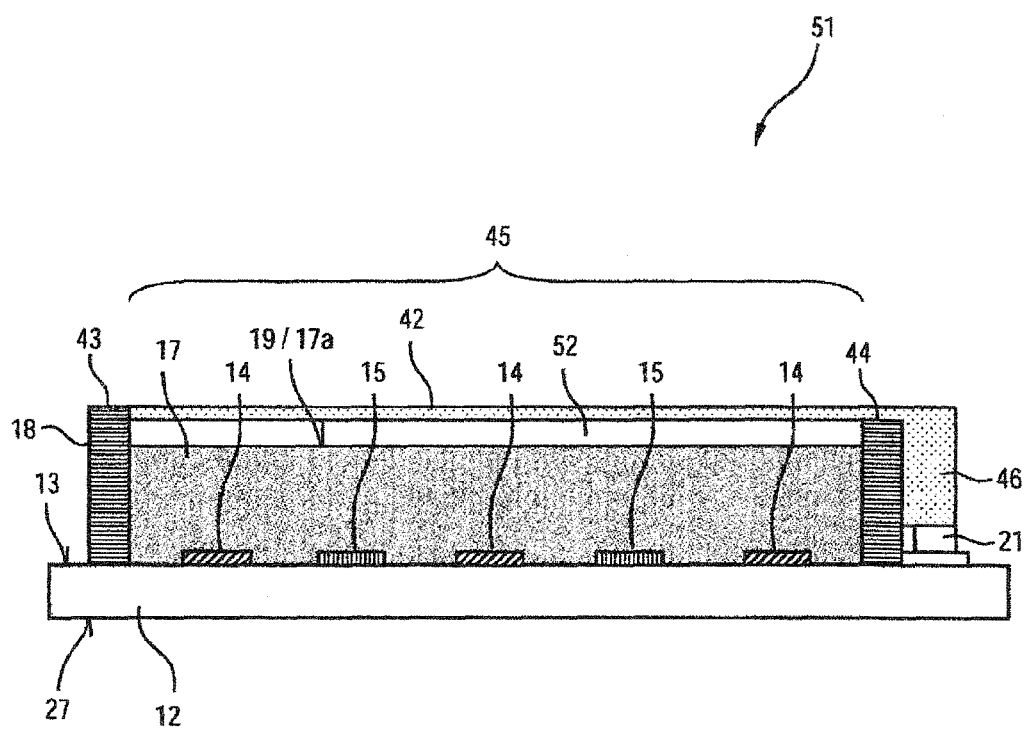
FIG. 5 shows a lighting device in accordance with a fourth embodiment as a sectional illustration in side view.

FIG. 5 shows a lighting device 51 in accordance with a fourth embodiment as a sectional illustration in side view. In this case, the transmission optical waveguide 42 is, in particular, a separately produced component, e.g. composed of plastic or glass, and is separated from the potting compound 17 serving as the diffuser by an air gap 52.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS

11 Lighting device
12 Printed circuit board
13 Front side of the printed circuit board
14 Red-emitting LED chip
15 Greenish-white-emitting LED chip
17 Potting compound
18 Lateral wall
19 Free surface of the potting compound
21 Color sensor
22 Optical waveguide
23 Coupling-out via
24 Through hole of the printed circuit board
25 Sleeve of the coupling-out via
26 Transparent material of the coupling-out via
27 Rear side of the printed circuit board
28 Continuation optical waveguide
29 Coupling-in via
31 Lighting device
41 Lighting device
42 Transmission optical waveguide
43 Upper edge of the lateral wall
44 Longitudinal groove in the upper edge
45 Region capable of transmission of the transmission optical waveguide
46 Outer region of the transmission optical waveguide
51 Lighting device
52 Air gap
b Cross-sectional width of the transparent material
G1-G4 Group of LED chips

The invention claimed is:

1. A lighting device comprising a plurality of semiconductor light sources of different colors, downstream of which a common diffuser is disposed, wherein the lighting device has at least one light sensor optically coupled to the diffuser,
    wherein the semiconductor light sources are arranged on a substrate and are potted with a potting material serving as the diffuser, and the substrate has at least one through hole which can be arranged for an optical via which optically couples to the diffuser, and
    wherein the optical via is coupled to a common optical waveguide at their side facing away from the light-emitting side of the semiconductor light sources and diffuser, which optical waveguide runs to the at least one light sensor.

2. The lighting device as claimed in claim 1,
    wherein a common optical via is assigned to the plurality of semiconductor light sources.

3. The lighting device as claimed in claim 1,
    wherein the at least one optical via is embodied as a heat conducting element.

4. The lighting device as claimed in claim 1,
    wherein the substrate has an optical via which is coupled to the optical waveguide on the rear side and is coupled to the light sensor on the front side.

5. The lighting device as claimed in claim 1,
    wherein said through hole is filled with a light-guiding and transparent material.

6. The lighting device as claimed in claim 5,
    wherein the light-guiding and transparent material includes epoxy resin, silicone, polycarbonate (PC), cyclo-olefin copolymer (COC) and polymethyl methacrylate (PMMA).

7. The lighting device as claimed in claim 1,
    wherein said through hole is filled with air.

* * * * *